(12) United States Patent
Yamamoto

(10) Patent No.: US 8,101,323 B2
(45) Date of Patent: Jan. 24, 2012

(54) FUEL CELL DEVICE AND ELECTRONIC EQUIPMENT USING FUEL CELL DEVICE

(75) Inventor: Tadao Yamamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 765 days.

(21) Appl. No.: 12/212,880

(22) Filed: Sep. 18, 2008

(65) Prior Publication Data

US 2009/0081521 A1 Mar. 26, 2009

(30) Foreign Application Priority Data

Sep. 21, 2007 (JP) ................. 2007-244968

(51) Int. Cl.
*H01M 8/00* (2006.01)
(52) U.S. Cl. .......................... 429/535; 429/34
(58) Field of Classification Search ............ 429/12, 429/13, 34, 38, 39, 514, 535
See application file for complete search history.

(56) References Cited

U.S. PATENT DOCUMENTS

| | | | |
|---|---|---|---|
| 6,099,983 A * | 8/2000 | Nakagaki et al. ............. | 429/424 |
| 6,416,899 B1 | 7/2002 | Wariishi et al. | |
| 2002/0071981 A1 | 6/2002 | Sano et al. | |
| 2004/0115508 A1 | 6/2004 | Noto | |
| 2004/0247980 A1 | 12/2004 | Beatty et al. | |
| 2005/0170233 A1 | 8/2005 | Beatty et al. | |
| 2007/0099061 A1 | 5/2007 | Na et al. | |

FOREIGN PATENT DOCUMENTS

| | | |
|---|---|---|
| EP | 1 213 780 A2 | 6/2002 |
| EP | 1 777 770 A1 | 4/2007 |
| JP | 04-355061 A | 12/1992 |
| JP | 2000-149977 A | 5/2000 |
| JP | 2002-184428 A | 6/2002 |
| JP | 2004-363101 A | 12/2004 |
| JP | 2006-202524 A | 8/2006 |
| JP | 2006-294503 A | 10/2006 |
| JP | 2007-141574 A | 6/2007 |

OTHER PUBLICATIONS

International Search Report dated Dec. 18, 2008 in connection to Application No. PCT/JP2008/066496.

(Continued)

*Primary Examiner* — David Vu
(74) *Attorney, Agent, or Firm* — Holtz, Holtz, Goodman & Chick, PC

(57) ABSTRACT

Disclosed is a fuel cell device comprising a plurality of generator cells to generate electric power by an electrochemical reaction of an oxidizing agent and a reducing agent, wherein the plurality of generator cells include: a plurality of gas flow paths to send a reactant gas for the electrochemical reaction respectively to the plurality of generator cells; and a plurality of inflow ports respectively provided at a position in which the reactant gas flows into each of the plurality of gas flow paths, and wherein among the plurality of inflow ports, a cross-sectional dimension of an inflow port provided at a downstream side of a flowing direction of the reactant gas is smaller than a cross-sectional dimension of an inflow port provided at an upstream side of the flowing direction of the reactant gas.

16 Claims, 14 Drawing Sheets

OTHER PUBLICATIONS

Written Opinion of the International Searching Authority dated Dec. 18, 2008 in connection to Application No. PCT/JP2008/066496.
Korean Office Action dated Aug. 18, 2011 (and English translation thereof) in counterpart Korean Application No. 10-2010-7004156.
Japanese Office Action dated Nov. 1, 2011 (and English translation thereof) in counterpart Japanese Application No. 2008-239108.

* cited by examiner

US 8,101,323 B2

FUEL CELL DEVICE AND ELECTRONIC EQUIPMENT USING FUEL CELL DEVICE

CROSS-REFERENCE TO RELATED APPLICATIONS

This application is based upon and claims the benefit of priority under 35 USC 119 of Japanese Patent Application No. 2007-244968 filed on Sep. 21, 2007, the entire disclosure of which, including the description, claims, drawings and abstract, is incorporated herein by reference in its entirety.

BACKGROUND OF THE INVENTION

1. Field of the Invention

The present invention relates to a fuel cell device to extract electric power therefrom by an electrochemical reaction of an oxidizing agent and a reducing agent, and to an electronic equipment comprising the fuel cell device.

2. Description of the Related Art

A generating device includes a fuel cell device equipped with a generator cell which generates electric power by an electrochemical reaction of a fuel, such as methanol, ethanol, or dimethyl ether, and oxygen. Fuel cell devices are roughly classified into two kinds of types; flat panel type ones and cylinder type ones It is required for the flat panel type fuel cell configured by laminating a plurality of generator cells to suppress the dispersion of the flow volume of a reactant gas to be supplied to a flow path of the reactant gas in each of the generator cells in order to heighten the generation efficiency of the fuel cell. For example, Japanese Patent Application Laid-Open Publication No. 2006-294503 describes the method of suppressing the dispersion of a gas flow volume in a gas flow path by setting the summation of the pressure loss of a reactant gas in a gas supply communicating section and the pressure loss of the reactant gas in a gas exhaust communicating section to be larger than the pressure loss of the reactant gas in the gas flow path.

However, because a plurality of gas flow paths are connected to one gas supply communicating section in parallel to one another, the flow volume of the reactant gas to be supplied to each of the gas flow paths is not uniform in the case of focusing attention to the plurality of gas flow paths, and Japanese Patent Application Laid-Open Publication No. 2006-294503 does not describe any method of suppressing the dispersion in the case described above.

SUMMARY OF THE INVENTION

A fuel cell device according to one aspect of the present invention, comprises a plurality of generator cells to generate electric power by an electrochemical reaction of an oxidizing agent and a reducing agent, wherein
the plurality of generator cells include:
a plurality of gas flow paths to send a reactant gas for the electrochemical reaction respectively to the plurality of generator cells; and
a plurality of inflow ports respectively provided at a position in which the reactant gas flows into each of the plurality of gas flow paths, and wherein
among the plurality of inflow ports, a cross-sectional dimension of an inflow port provided at a downstream side of a flowing direction of the reactant gas is smaller than a cross-sectional dimension of an inflow port provided at an upstream side of the flowing direction of the reactant gas.

A fuel cell device according to another aspect of the present invention, comprises a plurality of generator cells to generate electric power by an electrochemical reaction of an oxidizing agent and a reducing agent, wherein
the plurality of generator cells include:
a plurality of electrolyte layers so that a predetermined substance permeates therethrough;
a plurality of anodes respectively provided in one surface of each of the plurality of electrolyte layers;
a plurality of anode collector electrodes which respectively abut on each of the plurality of anodes, wherein a plurality of anode gas flow paths are respectively formed on each of abutting surfaces between the anode collector electrodes and the anodes so that anode gas including the reducing agent flows therethrough;
a plurality of cathodes respectively provided in the other surface of each of the plurality of electrolyte layers;
a plurality of cathode collector electrodes which respectively abut on each of the plurality of cathodes, wherein a plurality of cathode gas flow paths are respectively formed on each of abutting surfaces between the cathode collector electrodes and the cathodes so that cathode gas including the oxidizing agent flows therethrough;
a plurality of anode gas inflow ports respectively provided at a position in which the anode gas flows into each of the plurality of anode gas flow paths; and
a plurality of cathode gas inflow ports respectively provided at a position in which the cathode gas flows into each of the plurality of cathode gas flow paths, and wherein
among the plurality of anode gas inflow ports, a cross-sectional dimension of an inflow port provided at a downstream side of a flowing direction of the anode gas is smaller than a cross-sectional dimension of an inflow port provided at an upstream side of the flowing direction of the anode gas.

A fuel cell device according to still another aspect of the present invention, comprises a plurality of generator cells to generate electric power by an electrochemical reaction of an oxidizing agent and a reducing agent, wherein
the plurality of generator cells include:
a plurality of electrolyte layers so that a predetermined substance permeates therethrough;
a plurality of anodes respectively provided in one surface of each of the plurality of electrolyte layers;
a plurality of anode collector electrodes which respectively abut on each of the plurality of anodes, wherein a plurality of anode gas flow paths are respectively formed on each of abutting surfaces between the anode collector electrodes and the anodes so that anode gas including the reducing agent flows therethrough;
a plurality of cathodes respectively provided in the other surface of each of the plurality of electrolyte layers;
a plurality of cathode collector electrodes which respectively abut on each of the plurality of cathodes, wherein a plurality of cathode gas flow paths are respectively formed on each of abutting surfaces between the cathode collector electrodes and the cathodes so that cathode gas including the oxidizing agent flows therethrough;
a plurality of anode gas inflow ports respectively provided at a position in which the anode gas flows into each of the plurality of anode gas flow paths; and
a plurality of cathode gas inflow ports respectively provided at a position in which the cathode gas flows into each of the plurality of cathode gas flow paths, and wherein
among the plurality of cathode gas inflow ports, a cross-sectional dimension of an inflow port provided at a downstream side of a flowing direction of the cathode gas is smaller than a cross-sectional dimension of an inflow port provided at an upstream side of the flowing direction of the cathode gas.

An electronic equipment according to still another aspect of the present invention, comprises:
a fuel cell device comprising a plurality of generator cells to generate electric power by an electrochemical reaction of an oxidizing agent and a reducing agent, wherein
the plurality of generator cells include:
a plurality of gas flow paths to send a reactant gas for the electrochemical reaction respectively to the plurality of generator cells; and
a plurality of inflow ports respectively provided at a position in which the reactant gas flows into each of the plurality of gas flow paths, and wherein
among the plurality of inflow ports, a cross-sectional dimension of an inflow port provided at a downstream side of a flowing direction of the reactant gas is smaller than a cross-sectional dimension of an inflow port provided at an upstream side of the flowing direction of the reactant gas; and
an electronic equipment main body which operates by the electric power generated by the fuel cell device.

An electronic equipment according to still another aspect of the present invention, comprises:
a fuel cell device comprising a plurality of generator cells to generate electric power by an electrochemical reaction of an oxidizing agent and a reducing agent, wherein
the plurality of generator cells include:
a plurality of electrolyte layers so that a predetermined substance permeates therethrough;
a plurality of anodes respectively provided in one surface of each of the plurality of electrolyte layers;
a plurality of anode collector electrodes which respectively abut on each of the plurality of anodes, wherein a plurality of anode gas flow paths are respectively formed on each of abutting surfaces between the anode collector electrodes and the anodes so that anode gas including the reducing agent flows therethrough;
a plurality of cathodes respectively provided in the other surface of each of the plurality of electrolyte layers;
a plurality of cathode collector electrodes which respectively abut on each of the plurality of cathodes, wherein a plurality of cathode gas flow paths are respectively formed on each of abutting surfaces between the cathode collector electrodes and the cathodes so that cathode gas including the oxidizing agent flows therethrough;
a plurality of anode gas inflow ports respectively provided at a position in which the anode gas flows into each of the plurality of anode gas flow paths; and
a plurality of cathode gas inflow ports respectively provided at a position in which the cathode gas flows into each of the plurality of cathode gas flow paths, and wherein
among the plurality of anode gas inflow ports, a cross-sectional dimension of an inflow port provided at a downstream side of a flowing direction of the anode gas is smaller than a cross-sectional dimension of an inflow port provided at an upstream side of the flowing direction of the anode gas; and
an electronic equipment main body which operates by the electric power generated by the fuel cell device.

An electronic equipment according to still another aspect of the present invention, comprises:
a fuel cell device comprising a plurality of generator cells to generate electric power by an electrochemical reaction of an oxidizing agent and a reducing agent, wherein
the plurality of generator cells include:
a plurality of electrolyte layers so that a predetermined substance permeates therethrough;
a plurality of anodes respectively provided in one surface of each of the plurality of electrolyte layers;
a plurality of anode collector electrodes which respectively abut on each of the plurality of anodes, wherein a plurality of anode gas flow paths are respectively formed on each of abutting surfaces between the anode collector electrodes and the anodes so that anode gas including the reducing agent flows therethrough;
a plurality of cathodes respectively provided in the other surface of each of the plurality of electrolyte layers;
a plurality of cathode collector electrodes which respectively abut on each of the plurality of cathodes, wherein a plurality of cathode gas flow paths are respectively formed on each of abutting surfaces between the cathode collector electrodes and the cathodes so that cathode gas including the oxidizing agent flows therethrough;
a plurality of anode gas inflow ports respectively provided at a position in which the anode gas flows into each of the plurality of anode gas flow paths; and
a plurality of cathode gas inflow ports respectively provided at a position in which the cathode gas flows into each of the plurality of cathode gas flow paths, and wherein
among the plurality of cathode gas inflow ports, a cross-sectional dimension of an inflow port provided at a downstream side of a flowing direction of the cathode gas is smaller than a cross-sectional dimension of an inflow port provided at an upstream side of the flowing direction of the cathode gas; and
an electronic equipment main body which operates by the electric power generated by the fuel cell device.

BRIEF DESCRIPTION OF THE DRAWINGS

The present invention will sufficiently be understood by the flowing detailed description and accompanying drawings, but they are provided for illustration only, and not for limiting the scope of the invention.

DETAILED DESCRIPTION OF THE PREFERRED EMBODIMENTS

Embodiments of the present invention will be explained with reference to the drawings.

[Electronic Equipment]

Figure 1:
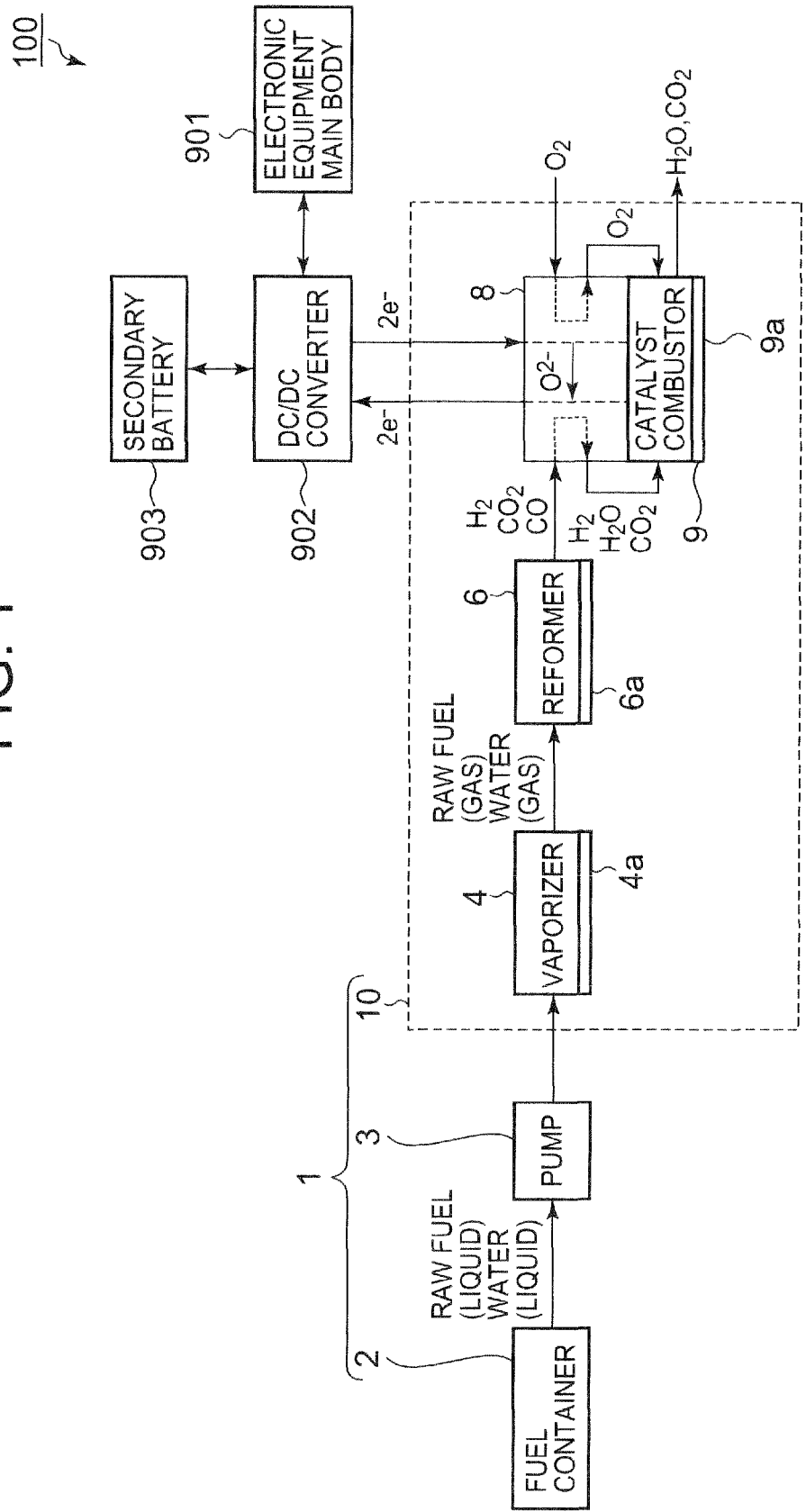
FIG. 1 is a block diagram showing a portable electronic equipment in which a fuel cell device is mounted.

FIG. 1 is a block diagram showing a portable electronic equipment 100 mounting a fuel cell device 1 thereon. The electronic equipment 100 is a portable electronic equipment such as a notebook-size personal computer, a personal digital assistant (PDA), an electronic personal organizer, a digital camera, a portable telephone, a wrist watch, a register, and a projector.

The electronic equipment 100 is composed of an electronic equipment main body 901, a DC/DC converter 902, a secondary battery 903, and the like, as well as the fuel cell device 1. The electronic equipment main body 901 is driven by the electric power supplied from the DC/DC converter 902 or the secondary battery 903. The DC/DC converter 902 converts the electric power generated by the fuel cell device 1 into a suitable voltage, and then supplies the electric power of the converted voltage to the electronic equipment main body 901. Moreover, the DC/DC converter 902 charges the secondary battery 903 with the electric power generated by the fuel cell device 1, and supplies the electric power accumulated in the secondary battery 903 to the electronic equipment main body 901 during a time when the fuel cell device 1 is not operating.

[Fuel Cell Device]

The fuel cell device 1 is equipped with a fuel container 2, a pump 3, a heat insulating package (heat insulating container) 10, and the like. The fuel container 2 of the fuel cell device 1 is provided for example to the electronic equipment 100 in a detachably attachable state. The pump 3 and the heat insulating package 10 are, for example, incorporated in the main body of the electronic equipment 100.

The fuel container 2 reserves a mixed liquid of a liquid raw fuel (such as, methanol, ethanol, or dimethyl ether) and water. Incidentally, the liquid raw fuel and the water may be served in separate containers. The pump 3 sucks the mixed liquid in the fuel container 2 to send the sucked liquid to a vaporizer 4 in the heat insulating package 10.

The vaporizer 4, a reformer 6, a generator cell 8, and a catalyst combustor 9 are housed in the heat insulating package 10. The barometric pressure of the internal space of the heat insulating package 10 is kept at a barometric pressure (for example, 10 Pa or less) lower than the atmospheric pressure in order to heighten the adiabatic effect of the internal space.

The vaporizer 4, the reformer 6, and the catalyst combustor 9 are provided with electric heater and temperature sensors 4a, 6a, and 9a, respectively. Since the electric resistance values of the electric heater and temperature sensors 4a, 6a, and 9a depend on temperature, the electric heater and temperature sensors 4a, 6a, and 9a also functions as temperature sensors to measure the temperatures of the vaporizer 4, the reformer 6, and the catalyst combustor 9, respectively.

The mixed liquid sent from the pump 3 to the vaporizer 4 is heated to about 110° C. to about 160° C. by the heat of the electric heater and temperature sensor 4a and the heat transferred from the catalyst combustor 9, and consequently the mixed liquid is vaporized. Then, a vaporized mixture gas is generated. The mixture gas generated in the vaporizer 4 is sent to the reformer 6.

A flow path is formed in the reformer 6, and a catalyst is carried on the wall surface of the flow path. The mixture gas sent from the vaporizer 4 to the reformer 6 flows through the flow path of the reformer 6, and is heated to about 300° C. to about 400° C. by the heat of the electric heater and temperature sensor 6a, the reaction heat of the generator cell 8, and the heat of the catalyst combustor 9, so that a reforming reaction is caused by aid of the catalyst. A mixture gas (reformed gas) of hydrogen as a fuel and carbon dioxide, and infinitesimal carbon monoxide and the like, as by-products, are generated by the reforming reaction of the raw fuel and the water. Incidentally, when the raw fuel is methanol, then steam reforming reaction as shown by the following formula (1) is mainly caused in the reformer 6.

$$CH_3OH + H_2O \rightarrow 3H_2 + CO_2 \quad (1)$$

The carbon monoxide is infinitesimally produced as a by-product in accordance with the formula such as the following formula (2) caused subsequently to the chemical reaction formula (1) sequentially.

$$H_2 + CO_2 \rightarrow H_2O + CO \quad (2)$$

The gases (reformed gases) generated according to the chemical reaction formulae (1) and (2) are sent to the generator cell 8.

Figure 2:
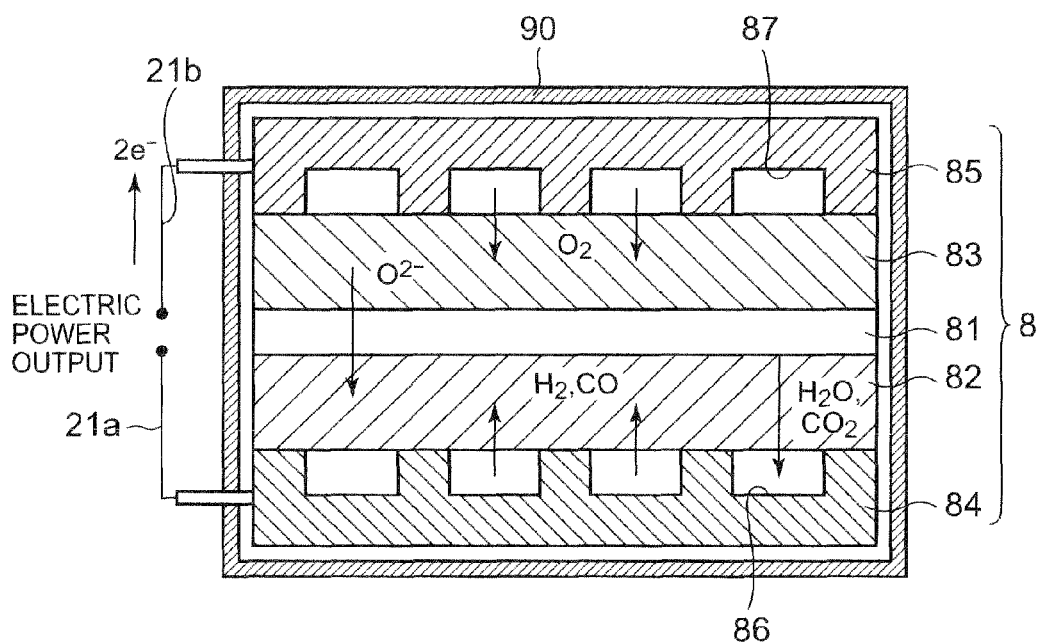
FIG. 2 is a schematic view of a generator cell.
Figure 3:
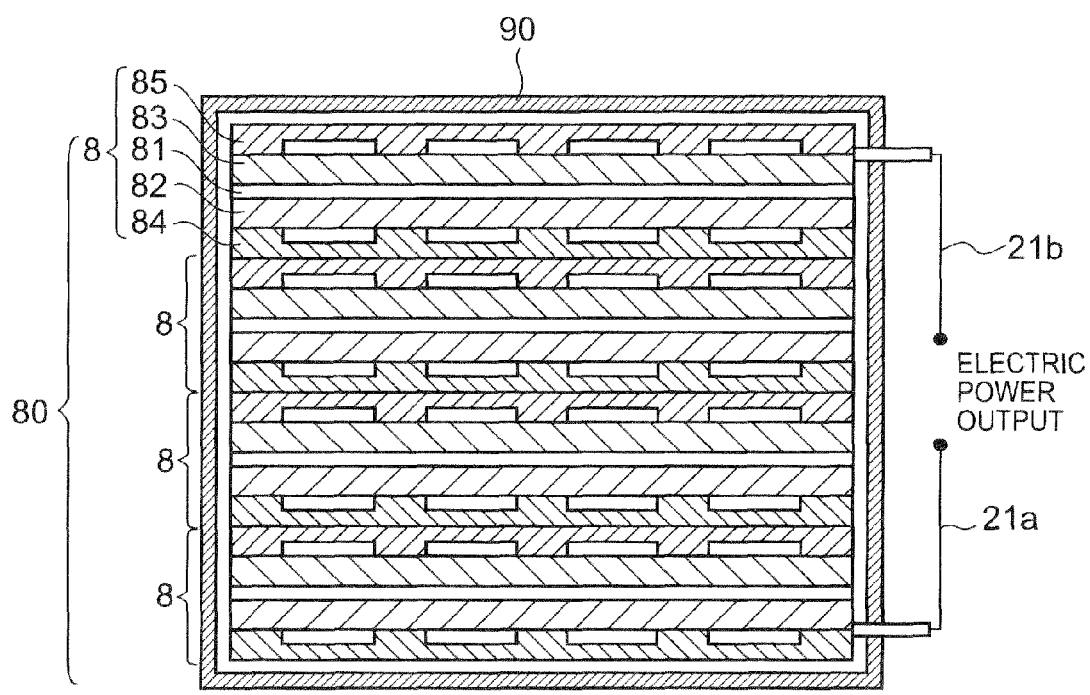
FIG. 3 is a schematic view of an example of a generator cell stack.

FIG. 2 is a schematic view showing the generator cell 8, and FIG. 3 is a schematic view showing an example of a generator cell stack. As shown in FIG. 2, the generator cell 8 is a solid oxide type fuel cell (SOFC) composed of a solid oxide type electrolyte 81, a fuel electrode 82 (anode) and an oxygen electrode 83 (cathode) formed on both sides of the solid oxide type electrolyte 81, respectively, an anode collector electrode 84 which abuts on the fuel electrode 82 and forms an anode gas flow path 86 on the principal plane (abutting surface) of the anode collector electrode 84 on the side of abutting, and a cathode collector electrode 85 which abuts on the oxygen electrode 83 and forms a cathode gas flow path 87 on the principal plane (abutting surface) of the cathode collector electrode 85 on the side of abutting. Moreover, the generator cell 8 is housed in a housing 90.

Zirconia based $(Zr_{1-x}Y_x)O_{2-x/2}$ (YSZ), lanthanum gallate based $(La_{1-x}Sr_x)(Ga_{1-y-z}Mg_yCo_z)O_3$, and the like, can be used as the solid oxide type electrolyte 81; $La_{0.84}Sr_{0.16}MnO_3$, La(Ni, Bi)O$_3$, (La, Sr)MnO$_3$, In$_2$O$_3$+SnO$_2$, LaCoO$_3$, and the like, can be used as the fuel electrode 82; Ni, Ni+YSZ, and the like, can be used as the oxygen electrode 83; and LaCr(Mg)O$_3$, (La, Sr)CrO$_3$, NiAl+Al$_2$O$_3$, and the like, can be used as the anode collector electrode 84 and the cathode collector electrode 85.

The generator cell 8 is heated to about 500° C. to 1000° C. by the heat of the electric heater and temperature sensor 9a and the catalyst combustor 9, and each reaction expressed by the following formulae (3)-(5) is caused.

Air (reactant gas, cathode gas) is sent to the oxygen electrode 83 through the cathode gas flow path 87 of the cathode collector electrode 85. Oxygen ions are generated in the oxygen electrode 83 by the electrons supplied by oxygen (oxidizing agent) and a cathode output electrode 21b as expressed by the following formula (3).

$$O_2 + 4e^- \rightarrow 2O^{2-} \qquad (3)$$

The solid oxide type electrolyte 81 has the permeability of the oxygen ions, and allows the oxygen ions generated in the oxygen electrode 83 according to the chemical reaction formula (3) to permeate through the solid oxide type electrolyte 81 to reach the fuel electrode 82.

The reformed gas (reactant gas, anode gas) exhausted from the reformer 6 is sent to the fuel electrode 82 through the anode gas flow path 86 of the anode collector electrode 84. In the fuel electrode 82, the reactions of the oxygen ions having permeated through the solid oxide type electrolyte 81, and the hydrogen (reducing agent) and the carbon monoxide in the reformed gas, which reactions are expressed by the following formulae (4) and (5), are caused.

$$H_2 + O^{2-} \rightarrow H_2O + 2e^- \qquad (4)$$

$$CO + O^{2-} \rightarrow CO_2 + 2e^- \qquad (5)$$

The electrons emitted in accordance with the chemical reaction formulae (4) and (5) are supplied from the cathode output electrode 21b to the oxygen electrode 83 through the fuel electrode 82, an anode output electrode 21a, and external circuits such as the DC/DC converter 902.

The anode output electrode 21a and the cathode output electrode 21b are connected to the anode collector electrode 84 and the cathode collector electrode 85, respectively, and the anode output electrode 21a and the cathode output electrode 21b penetrate the housing 90 to be drawn out. Here, as described later, the housing 90 is formed by, for example, a Ni based alloy, and the anode output electrode 21a and the cathode output electrode 21b are drawn out in the state of being insulated from the housing 90 with an insulating material, such as glass or ceramic. As shown in FIG. 1, the anode output electrode 21a and the cathode output electrode 21b are connected to, for example, the DC/DC converter 902.

FIG. 3 is a schematic view showing an example of a cell stack 80 composed of a plurality of generator cells 8. In the present invention, as shown in this figure, the plurality of generator cells 8, each composed of an anode collector electrode 84, a fuel electrode 82, a solid oxide type electrolyte 81, an oxygen electrode 83, and a cathode collector electrode 85, is laminated, and each of the plurality of generator cells 8 is electrically connected to each other in series to form the cell stack 80. In this case, the anode collector electrode 84 of the generator cell 8 at an end of the serially connected collector electrodes 84 is connected to the anode output electrode 21a, and the cathode collector electrode 85 of the generator cell 8 at the other end is connected to the cathode output electrode 21b. Furthermore, the cell stack 80 is housed in the housing 90.

The reformed gas that has passed through the anode gas flow path 86 of the anode collector electrode 84 (hereinafter the passed reformed gas is referred to as an offgas) also includes unreacted hydrogen. The offgas is supplied to the catalyst combustor 9.

The air that has passed through the cathode gas flow path 87 of the cathode collector electrode 85 is supplied to the catalyst combustor 9 together with the offgas. A flow path is formed in the catalyst combustor 9, and a Pt based catalyst is carried on the wall surface of the flow path. The electric heater and temperature sensor 9a made of an electric heating material is provided on the catalyst combustor 9. Since the electric resistance value of the electric heater and temperature sensor 9a depends on temperature, the electric heater and temperature sensor 9a also functions as a temperature sensor to measure the temperature of the catalyst combustor 9.

A mixture gas (combustion gas) composed of the offgas and the air flows through the flow path of the catalyst combustor 9, and is heated by the electric heater and temperature sensor 9a. The hydrogen in the combustion gas flowing through the flow path of the catalyst combustor 9 is combusted by the catalyst, and consequently combustion heat is produced. The exhaust gas after combusting is emitted from the catalyst combustor 9 to the outside of the heat insulating package 10.

The combustion heat produced in the catalyst combustor 9 is used for keeping the temperature of the generator cell 8 at a high temperature (about 500° C. to about 1000° C.). Then, the heat of the generator cell 8 conducts to the reformer 6 and the vaporizer 4, and is used for the evaporation in the vaporizer 4 and the steam reforming reaction in the reformer 6.

[Heat Insulating Package]

Next, the concrete configuration of the heat insulating package 10 is described.

Figure 4:
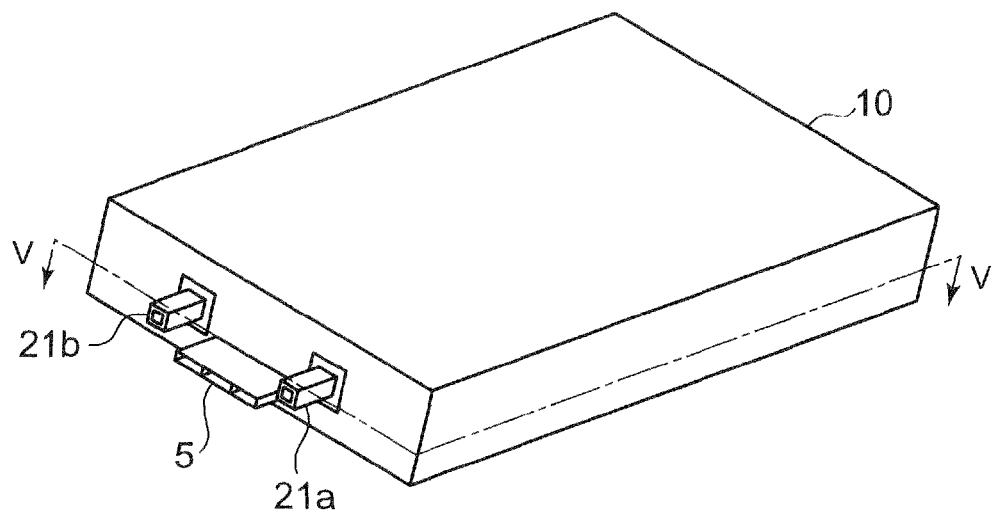
FIG. 4 is a perspective view of a heat insulating package.
Figure 5:
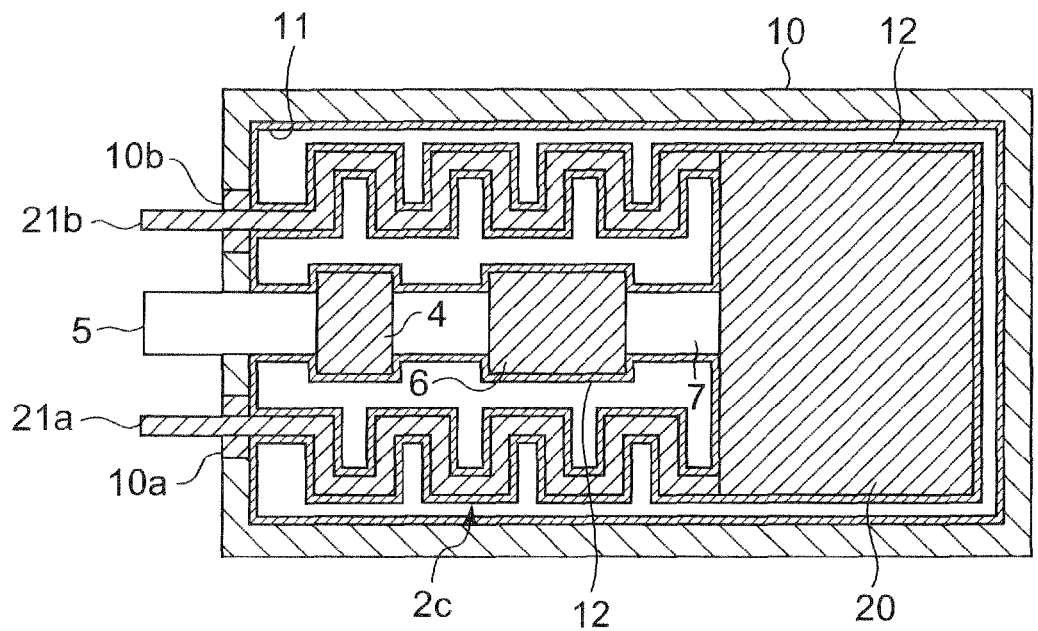
FIG. 5 is a sectional view taken along a line V-V in FIG. 4 looked at from the direction along the arrows.
Figure 6:
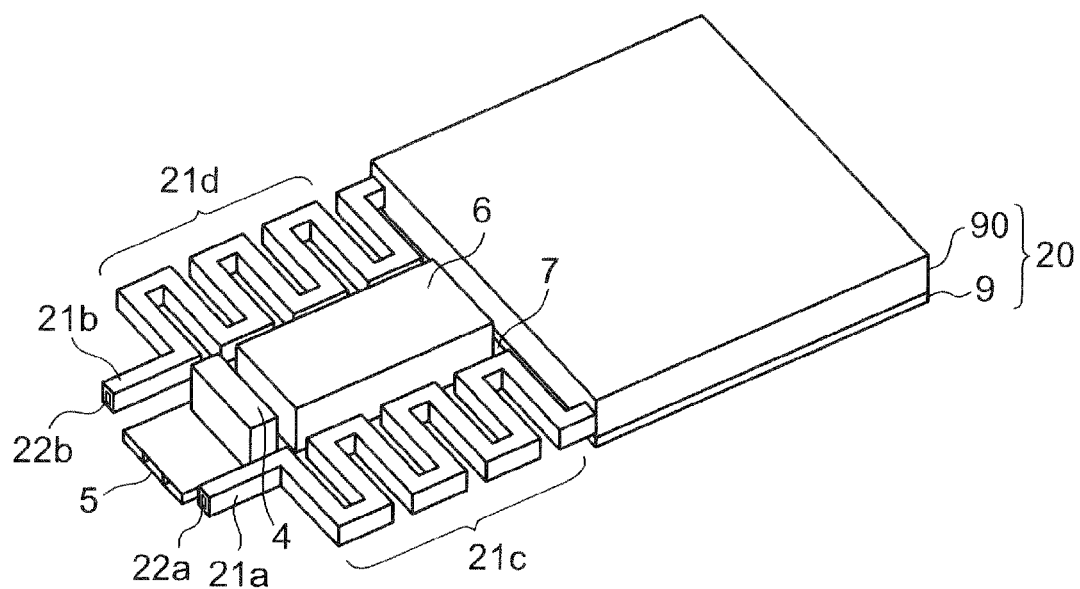
FIG. 6 is a perspective view showing the internal structure of the heat insulating package.

FIG. 4 is a perspective view of the heat insulating package 10, and FIG. 5 is a sectional view taken along a line V-V in FIG. 4 when it is looked at from the direction of the arrows. FIG. 6 is a perspective view showing the internal structure of the heat insulating package 10, and FIG. 7 is a perspective view of the internal structure of the heat insulating package 10 of FIG. 6 when it is looked at from the lower side thereof.

As shown in FIG. 4, a connection section 5, the anode output electrode 21a, and the cathode output electrode 21b project from one wall surface of the heat insulating package 10. Incidentally, as shown in FIG. 5, the parts of the heat insulating package 10 at which the anode output electrode 21a and the cathode output electrode 21b penetrate the heat insulating package 10 is insulated from the electrodes 21a and 21b with insulating materials 10a and 10b, respectively.

Figure 7:
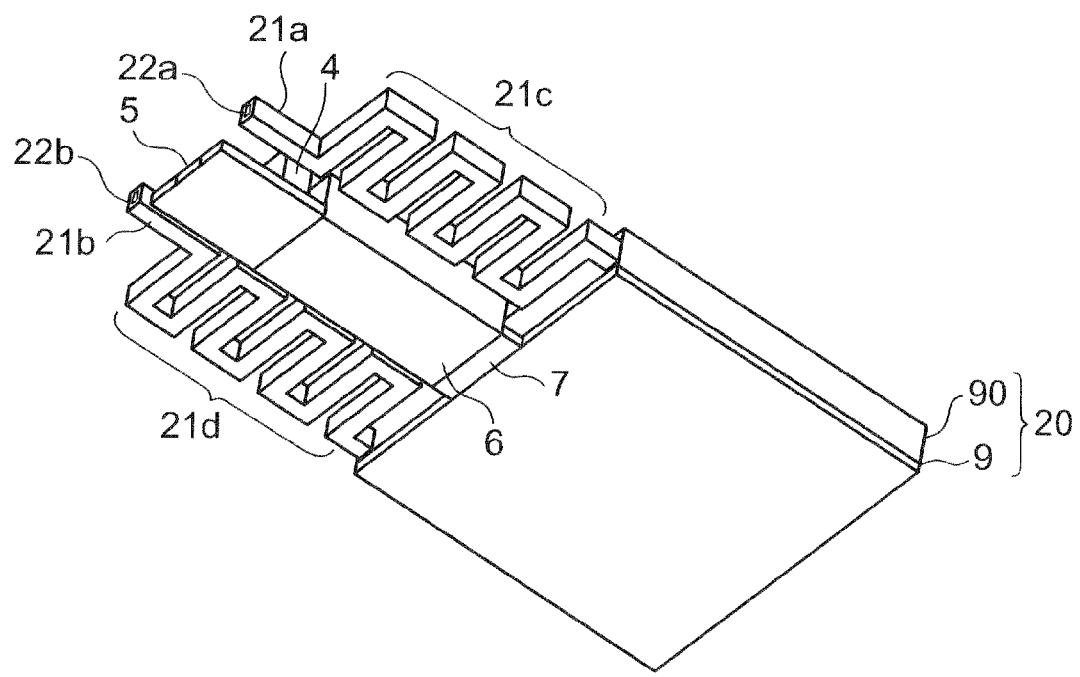
FIG. 7 is a perspective view showing the internal structure of the heat insulating package of FIG. 6 when it is looked at from the lower side thereof.

As shown in FIGS. 5-7, the vaporizer 4, and the connection section 5, the reformer C, a connection section 7 and a fuel cell section 20 are arranged, the latter four arranged in this order, in the heat insulating package 10. Incidentally, the fuel cell section 20 is formed by integrating the housing 90 housing the generator cell 8 with the catalyst combustor 9, and an offgas is supplied from the fuel electrode 82 of the generator cell 8 to the catalyst combustor 9.

The vaporizer 4, the connection section 5, the reformer 6, the connection section 7, the housing 90 housing the generator cell 8 and the catalyst combustor 9 of the fuel cell section 20, the anode output electrode 21a, and the cathode output electrode 21b are made of a metal having high-temperature endurance and moderate heat conductance, and can be formed by the use of a Ni based alloy, such as Inconel 783. In particular, in order to suppress the breakage of the anode output electrode 21a and the cathode output electrode 21b connected to the anode collector electrode 84 and the cathode collector electrode 85 in the fuel cell section 20, respectively, and drawn out from the housing 90 owing to receiving a stress caused by a difference of coefficients of thermal expansions accompanied by a temperature rise of the generator cell 8, it is preferable to form at least the anode output electrode 21a and the cathode output electrode 21b of the same material as that of the housing 90. Furthermore, in order to reduce the stresses produced among the vaporizer 4, the connection section 5, the reformer 6, the connection section 7, and the housing 90 and the catalyst combustor 9 of the fuel cell section 20, accompanied by the temperature rise, it is preferable to form them of the same material.

A radiation preventing film 11 is formed on the internal wall surface of the heat insulating package 10, and a radiation preventing film 12 is formed on the external wall surfaces of the vaporizer 4, the connection section 5, the reformer 6, the connection section 7, the anode output electrode 21a, the cathode output electrode 21b, and the fuel cell section 20, respectively. The radiation preventing films 11 and 12 prevent the heat transfer by radiation, and for example, Au, Ag, and the like, can be used for the radiation preventing films 11 and 12. It is preferable to be provided with at least one of the radiation preventing films 11 and 12, and it is more preferable to be provided with both of the radiation preventing films 11 and 12.

The connection section 5 penetrates the heat insulating package 10. One end of the connection section 5 is connected the pump 3 on the outside of the heat insulating package 10, and the other end thereof is connected to the reformer 6. The vaporizer 4 is provided in the middle portion of the connection section 5. The reformer 6 and the fuel cell section 20 are connected to each other with the connection section 7 put between them.

As shown in FIGS. 6 and 7, the vaporizer 4, the connection section 5, the reformer 6, the connection section 7, and the fuel cell section 20 are integrally formed, and their under surfaces are formed to be flush.

Figure 8:
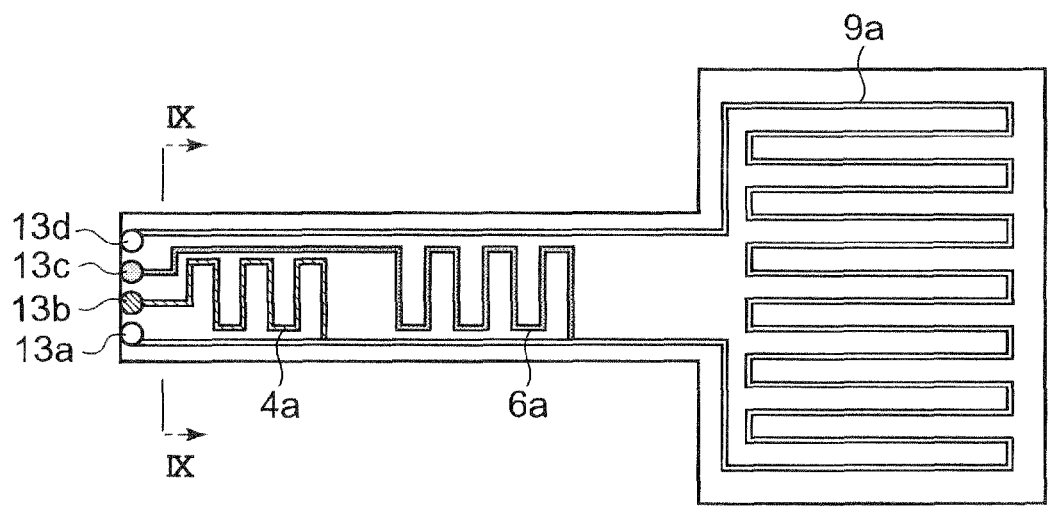
FIG. 8 is a bottom view showing a connection section, a reformer, a connection section, a fuel cell section, arranged in the order.

FIG. 8 is a bottom view of the connection section 5, the reformer 6, the connection section 7, and the fuel cell section 20. Incidentally, the anode output electrode 21a and the cathode output electrode 21b are omitted to be shown in FIG. 8.

As shown in FIG. 8, a wiring pattern is formed on the under surfaces of the connection section 5, the reformer 6, the connection section 7, and the fuel cell section 20 after performing their insulation processing with ceramic or the like. The wiring pattern is formed in the lower part of the vaporizer 4, the lower part of the reformer 6, and the lower part of the fuel cell section 20 in a zigzag state to be the electric heater and temperature sensors 4a, 6a, and 9a, respectively. One end of each of the electric heater and temperature sensors 4a, 6a, and 9a is connected to a common terminal 13a, and the other ends of them are connected to three independent terminals 13b, 13c, and 13d, respectively. The four terminals 13a, 13b, 13c, and 13d are formed on the end of the connection section 5 on the outer side of the heat insulating package 10.

Figure 9:
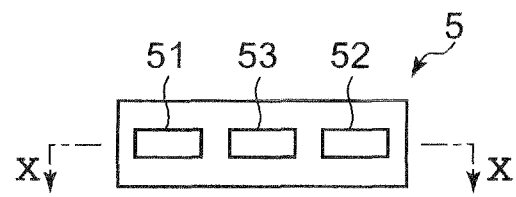
FIG. 9 is a sectional view showing the connection section of FIG. 8 taken along a line IX-IX of FIG. 8 when it is looked at from the direction of the arrows in FIG. 8.
Figure 10:
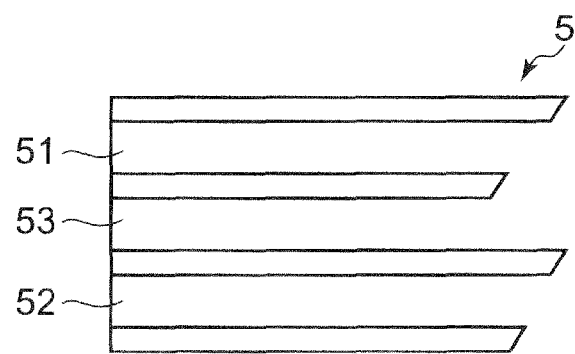
FIG. 10 is a sectional view showing the connection section of FIG. 8 taken along a line X-X in FIG. 9 when it is looked at from the direction of the arrows in FIG. 9.

FIG. 9 is a sectional view taken along a line IX-IX in FIG. 8 when it is looked at from the direction of the arrows, and FIG. 10 is a sectional view taken along a line X-X of FIG. 9 when it is looked at from the direction of the arrows.

Exhausting flow paths 51 and 52 of the exhaust gas to be exhausted from the catalyst combustor 9 are formed in the connection section 5. Moreover, a supplying flow path 53 of the mixture gas to be sent from the vaporizer 4 to the reformer 6 is formed in the connection section 5.

Similarly, exhausting flow paths (not shown) of the exhaust gas to be exhausted from the catalyst combustor 9, which exhausting flow paths communicating with the exhausting flow paths 51 and 52, respectively, are formed in the connection section 7. Moreover, a supplying flow path (not shown) of the reformed gas to be sent from the reformer 6 to the fuel electrode 82 of the generator cell 8 is formed in the connection section 7. By the connection sections 5 and 7, the supplying flow path of the raw fuel, the mixture gas, and the reformed gas to the vaporizer 4, the reformer 6, and fuel cell section 20, and the exhausting flow paths of the exhaust gas are secured.

Incidentally, in order to sufficiently enlarge the flow path diameter of the exhaust gas to be exhausted from the catalyst combustor 9 to that of the offgas and the air supplied to the catalyst combustor 9, the two flow paths are used as the flow paths of the exhaust gas from the catalyst combustor 9, and the other one flow path is used as the supplying flow path of the reformed gas to the fuel electrode 82 of the generator 8, among the three flow paths formed in the connection section 7.

One end of each of the anode output electrode 21a and the cathode output electrode 21b are drawn out from the surface of the fuel cell section 20 on the side on which the fuel cell section 20 is connected to the connection section 7 as shown in FIGS. 6 and 7. The other end of each of the anode output electrode 21a and the cathode output electrode 21b projects to the outside from the same wall surface of the heat insulating package 10 as the one from which the connection section 5 projects, as shown in FIG. 4.

Incidentally, in the present embodiment, the connection section 7 is connected to the fuel cell section 20 at the central part of one surface thereof, and the anode output electrode 21a and the cathode output electrode 21b are drawn out from opposing sections of the same surface. Consequently, the fuel cell section 20 is supported at three points of the connection section 7, the anode output electrode 21a, and the cathode output electrode 21b, and thereby the fuel cell section 20 can be stably held in the heat insulating package 10.

The anode output electrode 21a and the cathode output electrode 21b include bent portions 21c and 21d bent in the space between the internal wall surface of the heat insulating package 10 and the fuel cell section 20, as shown in FIGS. 6 and 7. The bent portions 21c and 21d fill the role of relieving the stress originating in the difference between the thermally expanded amounts of the fuel cell section 20, and the heat insulating package 10 which is at a lower temperature than that of the fuel cell section 20, which stress operates between the fuel cell section 20 and the heat insulating package 10 through the anode output electrode 21a and the cathode output electrode 21b.

The anode output electrode 21a is drawn out from the anode collector electrode 84 of the generator cell 8, and the cathode output electrode 21b is drawn out from the cathode collector electrode 85 of the generator cell 8. The anode output electrode 21a and the cathode output electrode 21b are each formed to be a hollow pipe, and the insides of the anode output electrode 21a and the cathode output electrode 21b are formed as air supplying flow paths 22a and 22b to supply the air to the oxygen electrode 83 of the generator cell 8.

Figure 11:
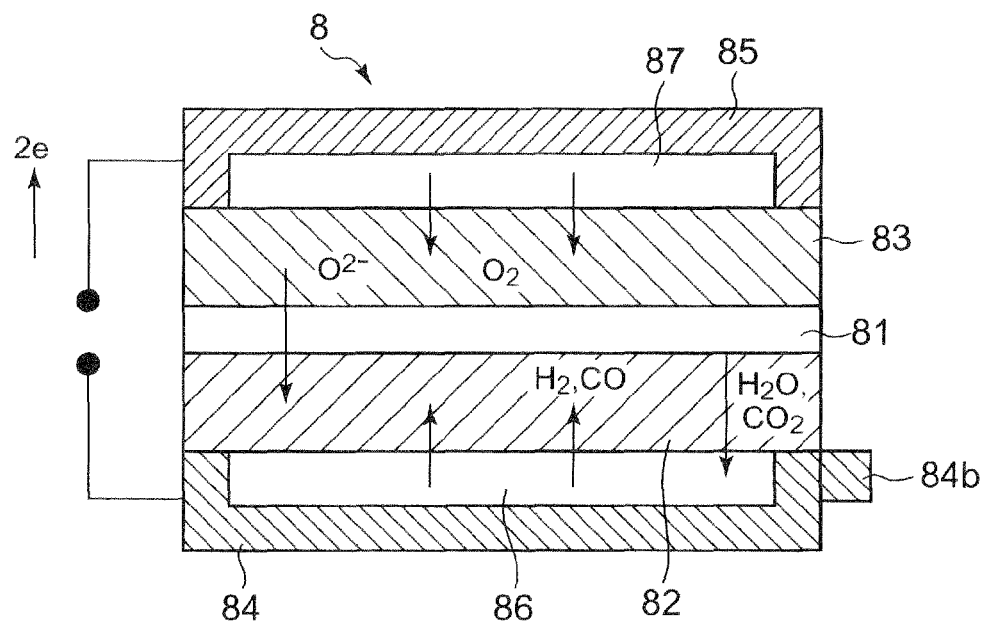
FIG. 11 is a sectional view showing the shape of an anode gas flow path of the generator cell.
Figure 12:
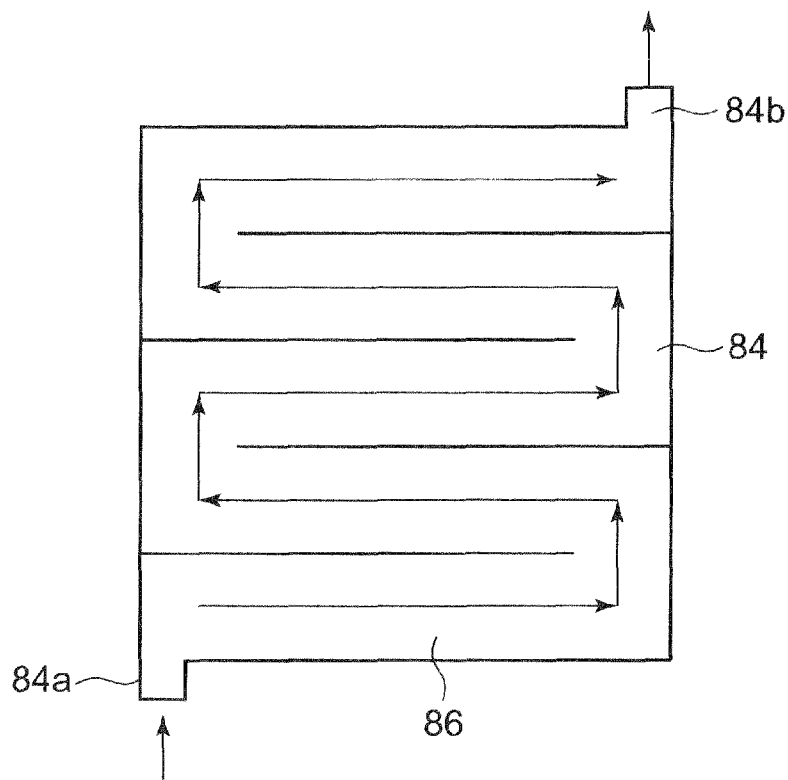
FIG. 12 is a plan view showing the shape of the anode gas flow path of the generator cell.
Figure 13:
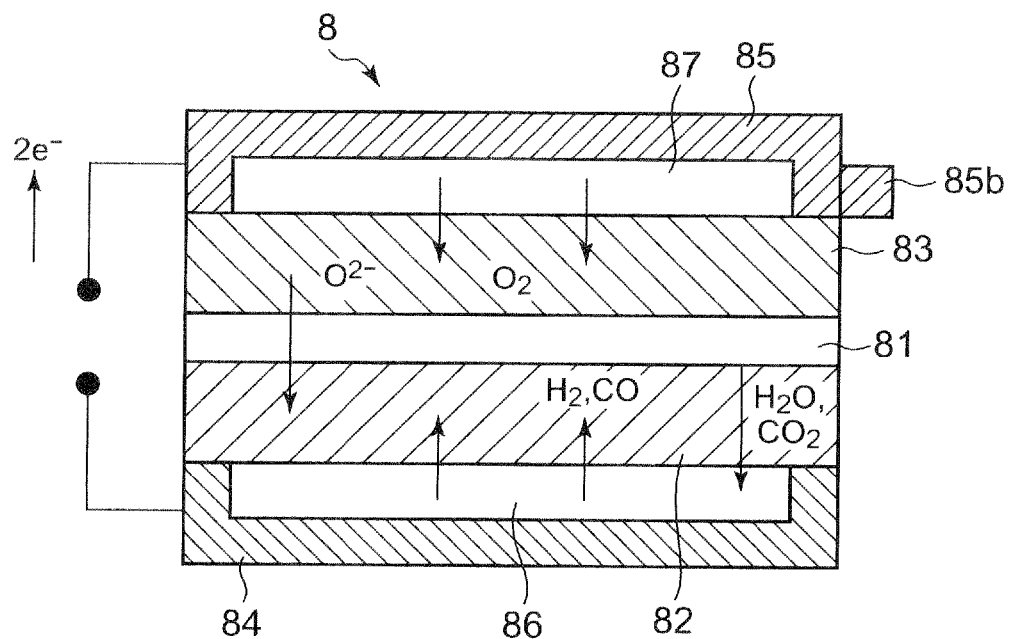
FIG. 13 is a sectional view showing the shape of a cathode gas flow path of a generator cell.
Figure 14:
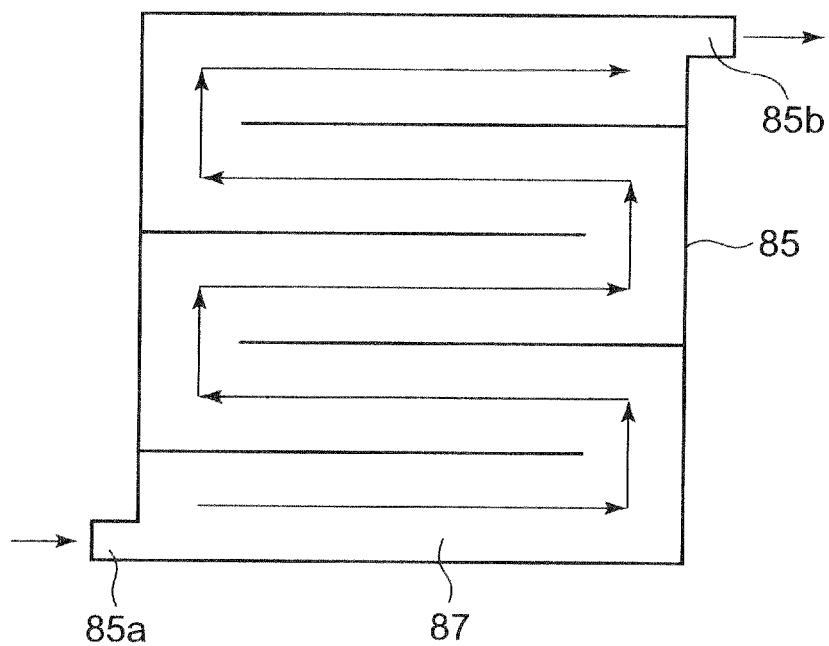
FIG. 14 is a plan view showing the shape of the cathode gas flow path of the generator cell.
Figure 15:
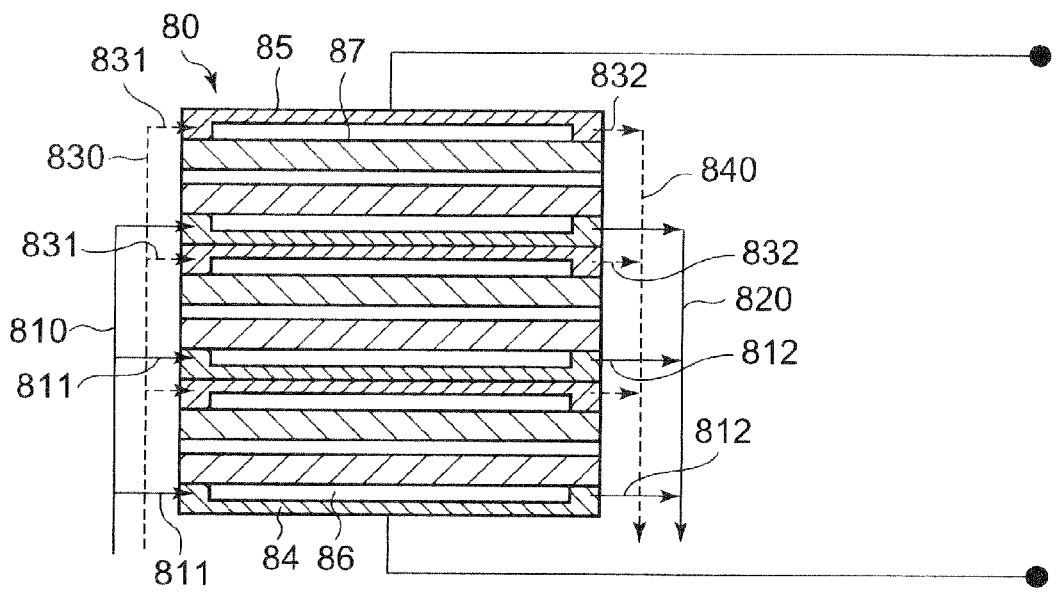
FIG. 15 is a sectional view showing the configurations of the anode gas flow paths and the cathode gas flow paths in case of forming the generator cells as a cell stack.

FIGS. 11 and 12 are a sectional view and a plan view, respectively, showing the shape the anode gas flow path 86 in the generator cell 8. FIGS. 13 and 14 are a sectional view and a plan view, respectively, showing the shape of the cathode gas flow path 87 in the generator cell 8. FIG. 15 is a sectional view showing the configuration of the anode gas flow path 86 and the cathode gas flow path 87 in the case where the generator cells 8 are laminated to form the cell stack 80.

The anode gas flow path 86 formed in the anode collector electrode 84 is formed in a zigzag shape as shown in FIGS. 11 and 12. The cathode gas flow path 87 formed in the cathode collector electrode 85 are similarly formed in a zigzag shape as shown in FIGS. 13 and 14.

The one end of the cathode gas flow path 87 is connected to the air supplying flow paths 22a and 22b through a cathode gas supplying manifold (common supplying path) described below, and the cathode gas flow path 87 supplies the air supplied from the air supplying flow paths 22a and 22b to the oxygen electrode 83, passing the air through the inside thereof. The other end of the cathode gas flow path 87 is provided with a cathode gas exhausting manifold (common exhausting path), which will be described later, communicating with the catalyst combustor 9. The air that has not been used for the reaction of the chemical reaction formula (3) in the oxygen electrode 83 to remain therein is supplied from the cathode gas exhausting manifold to the catalyst combustor 9.

When the plurality of generator cells 8 is laminated to form the cell stack 80, it is more advantageous to stack the generator cells 8 in the way in which the gas flow paths of the generator cells 8 are arranged in parallel with each other, as shown in FIG. 15, than to stack the generator cells 8 in the way in which the gas flow paths of the generator cells are arranged in series with each other from the point of view of reducing the pressure losses of the gas flow paths. By arranging the gas flow paths in parallel with each other, it is possible to shorten the gas flow paths, and to reduce their pressure losses by just that much.

By taking this point in consideration, the cell stack 80 of the present embodiment is provided with an anode gas supplying manifold 810 for uniformly dispersing the reformed gas including hydrogen in each of the anode gas flow paths 86 of the laminated generator cells 8 to perform the parallel supply of the reformed gas, and an anode gas exhausting manifold 820 for joining the reformed gases including unreacted hydrogen having passed through each of the anode gas flow paths 86 to exhaust the joined gases.

Furthermore, the cell stack 80 is provided with a cathode gas supplying manifold 830 for uniformly dispersing the air including oxygen into each of the cathode gas flow paths 87 of the laminated generator cells 8 to perform the parallel supply of the air, and a cathode gas exhausting manifold 840 for joining the air including unreacted oxygen having passed through each of the cathode gas flow paths 87 to exhaust the joined air.

Figure 16:
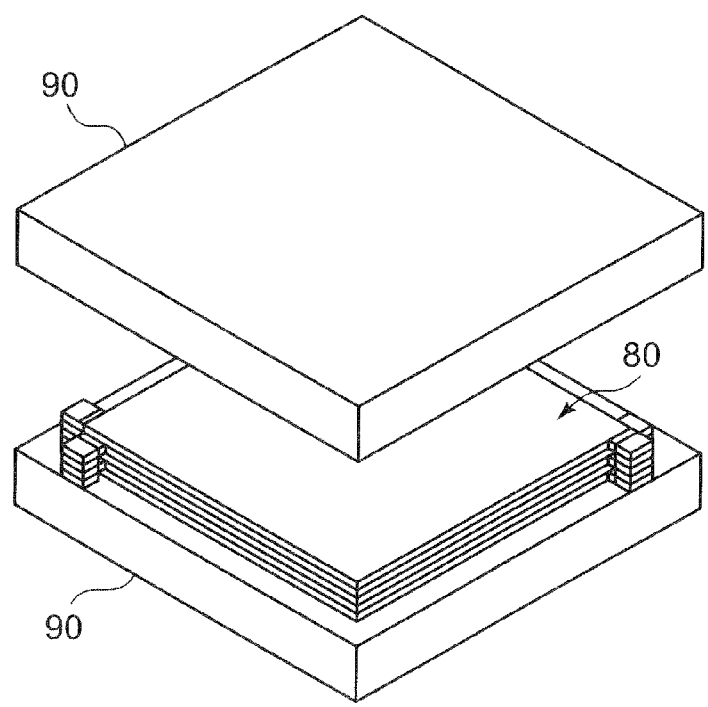
FIG. 16 is a perspective view showing the cell stack hosed in a housing.
Figure 17:
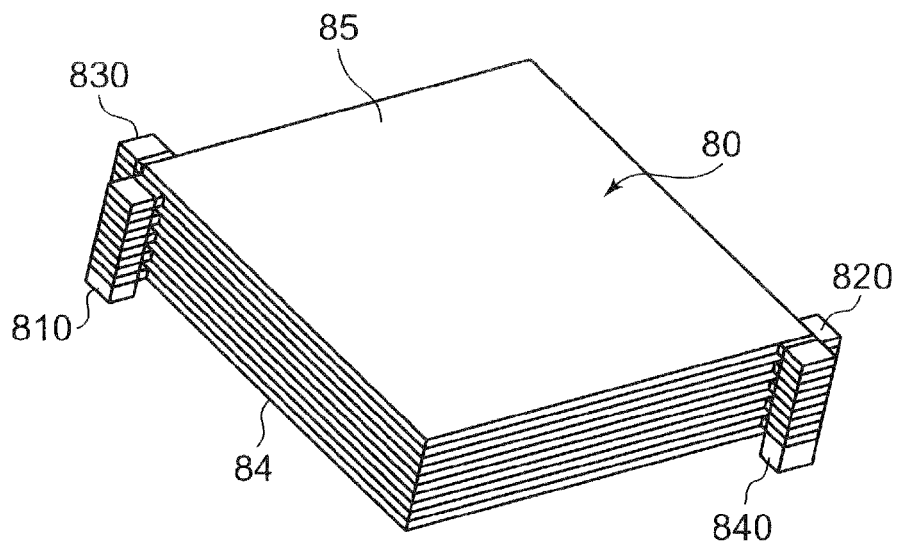
FIG. 17 is a perspective view showing the cell stack when it is looked at from above.
Figure 18:
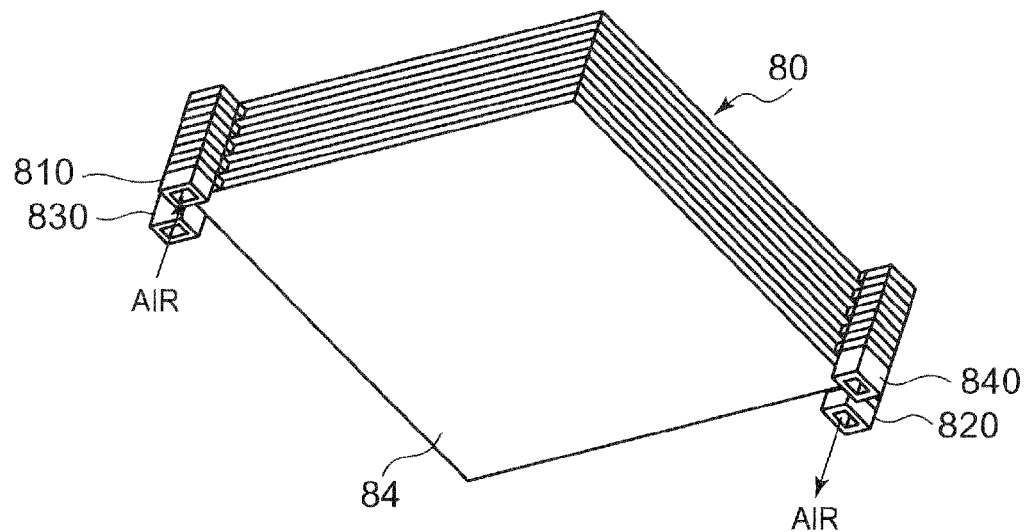
FIG. 18 is a perspective view showing the cell stack when it is looked at from below.
Figure 19:
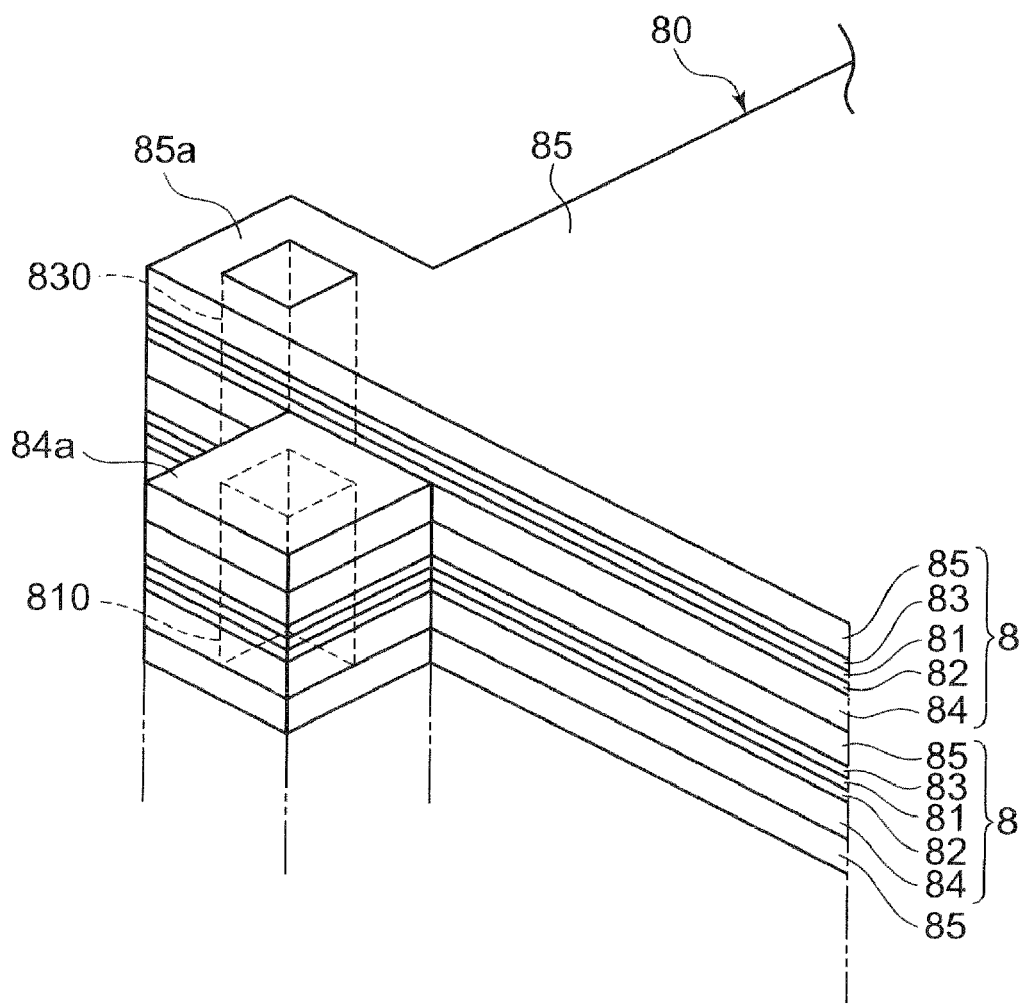
FIG. 19 is an enlarged view conceptually showing the solid shape of the principal part of the cell stack.

FIG. 16 is a perspective view of the cell stack 80 housed in the housing 90. FIG. 17 is a perspective view of the cell stack 80 when it is looked at from above, and FIG. 18 is a perspective view of the cell stack 80 when it is looked at from below. FIG. 19 is an enlarged view conceptually showing the solid shape of the principal part of the cell stack 80.

Both of the anode collector electrodes 84 and the cathode collector electrodes 85 are flat rectangles. Projecting parts 84a and 85a forming a part of the gas supplying manifolds are formed on one of two corners opposing to each other in a direction of a diagonal line among four corners of the flat rectangles, and projecting parts 84b and 85b forming a part of the gas exhausting manifolds are formed on the other one of the two corners opposing to each other (see FIG. 19).

In the present embodiment, the anode gas supplying manifold 810 and the cathode gas supplying manifold 830 are arranged on one sides of the anode collector electrodes 84 and the cathode collector electrodes 85, and the anode gas exhausting manifold 820 and the cathode gas exhausting manifold 840 are arranged on the other sides of the anode collector electrodes 84 and the cathode collector electrodes 85.

Figure 20:
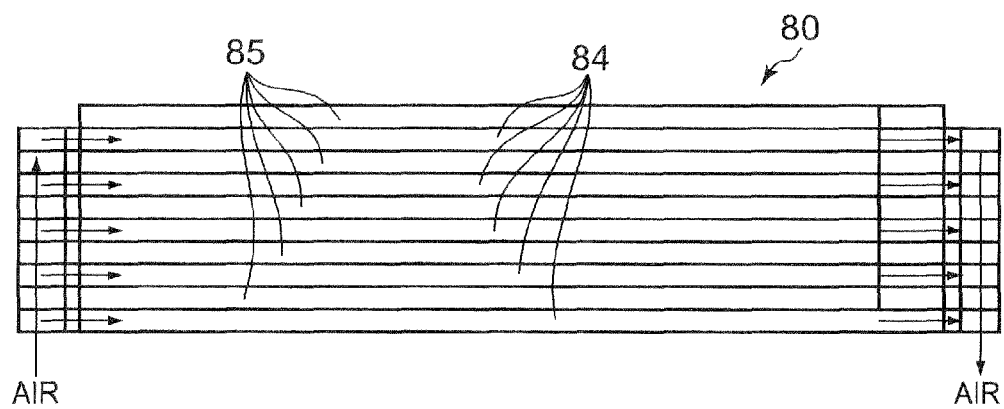
FIG. 20 is a sectional side view of the cell stack.
Figure 21:
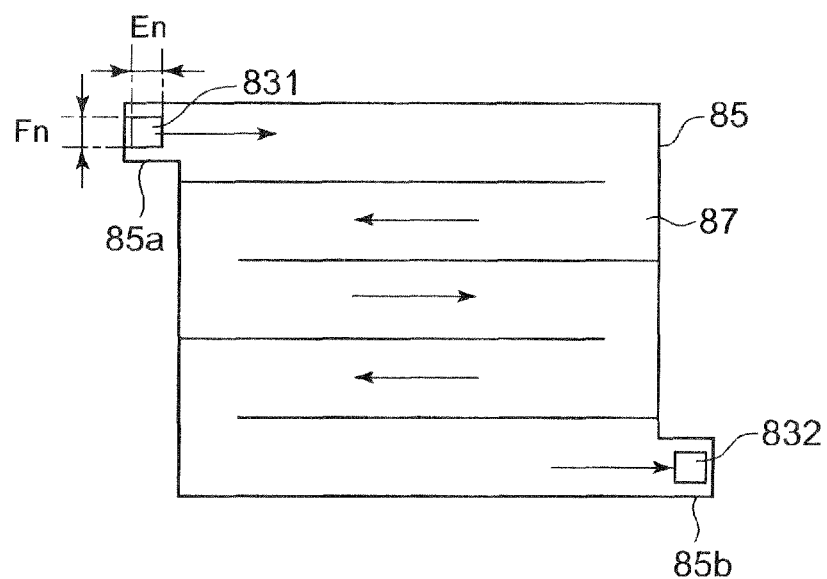
FIG. 21 is a plan view showing an inflow port, an outflow port, and a cathode gas flow path of the cell stack.
Figure 22:
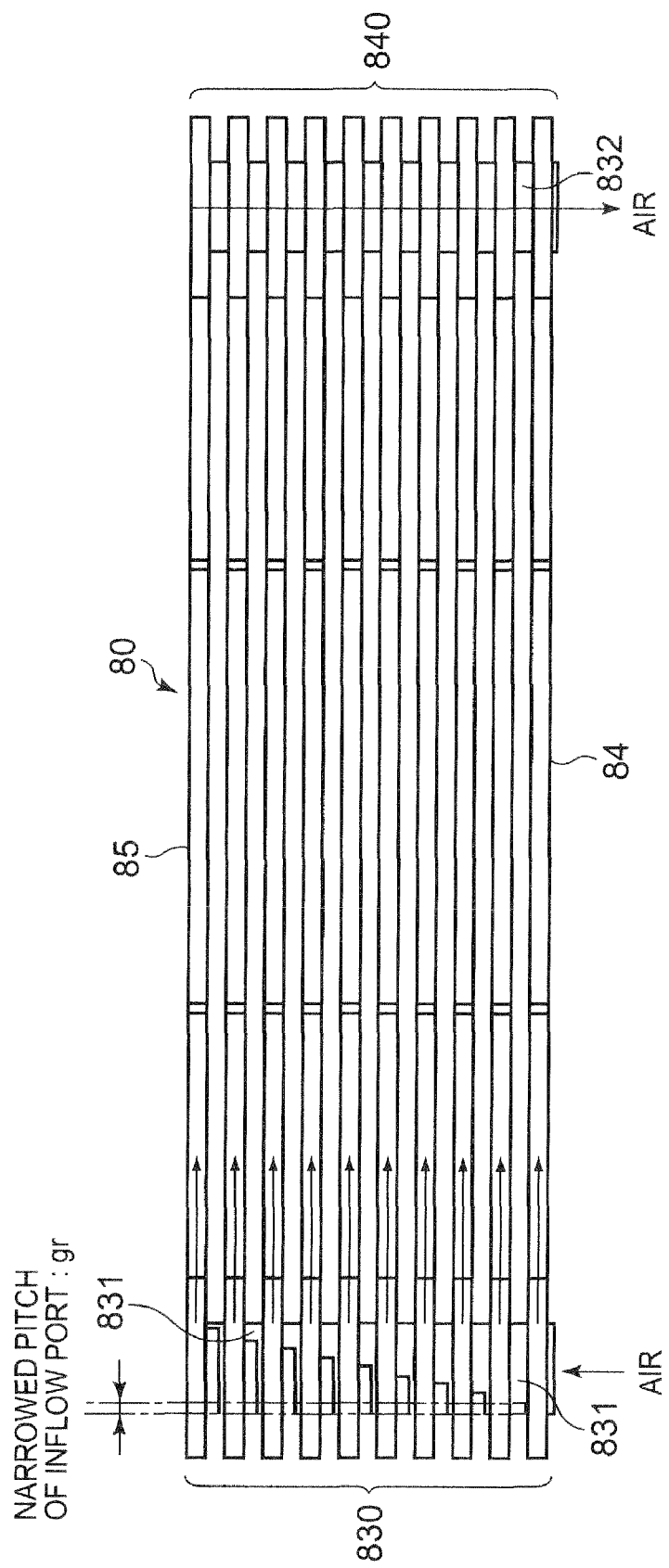
FIG. 22 is a sectional side view showing the narrowed pitch of each inflow port of the cell stack.
Figure 23:
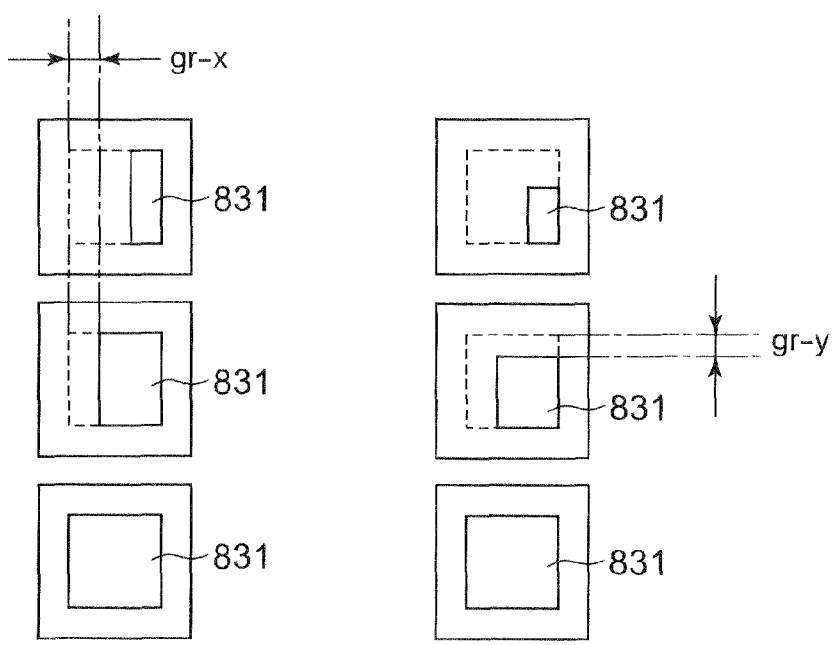
FIG. 23 is a plan view showing the narrowed pitch of each inflow port of the cell stack.

FIG. 20 is a sectional side view of the cell stack, and FIG. 21 is a plan view showing an inflow port, an outflow port, and a cathode gas flow path of the cell stack. FIG. 22 is a sectional side view showing a narrowed pitch of each inflow port of the cell stack. Moreover, FIG. 23 is a plan view showing the narrowed pitch of each inflow port of the cell stack. The anode gas supplying manifold 810 and the cathode gas supplying manifold 830 extend in straight lines in the thickness direction of the cell stack 80 (the lamination direction of the generator cells 8). Also the anode gas exhausting manifold 820 and the cathode gas exhausting manifold 840 extend in straight lines in the thickness direction of the cell stack 80. The inflows and the outflows of the air, which is the gases in the cathode gas flow paths 87, are shown by arrows in FIGS. 18, 20, and 22.

Cathode gas inflow ports 831 for adjusting flow volumes are formed in the cathode collector electrodes 85 between the cathode gas supplying manifold 830 and the cathode gas flow paths 87 of the generator cells 8 in the cell stack 80, as shown in FIGS. 20-23. Consequently, the cathode gas inflow ports 831 are formed in series from the cathode gas supplying manifold 830 to the cathode gas flow paths 87 of the generator cells 8.

Each of the cathode gas inflow ports 831 is formed to be a flat rectangle having a cross-sectional area different from one another. That is, the cathode gas inflow ports 831 are formed to have the cross sections of the sizes becoming smaller in order from the ones situated on the upstream side of the cathode gas supplying manifold 830 to the ones on the downstream side thereof. The shapes of the cross sections of the cathode gas inflow ports 831 are not limited to the flat rectangles, but may be the ones of a circle, a triangle, and a polygon of a quadrilateral or more angles.

Incidentally, the discharging direction of the air supplied (discharged) from the air supplying flow paths 22a and 22b to the cathode gas supplying manifold 830 by a not-shown air pump is set to face the lamination direction of the generator cell 8 (the lengthwise direction of the cathode gas supplying manifold) as shown in FIG. 22. The reason of the setting of the discharging direction of the air is that the flow volumes of the air in each of the cathode gas flow paths 87 can be made to be almost uniform without any dispersion by setting the discharging direction of the air to the lengthwise direction of the cathode gas supplying manifold and by forming the sizes of the cross sections of the cathode gas inflow ports 831 to become smaller in order from the ones situated on the upstream side of the cathode gas supplying manifold 830 to the ones situated on the downstream side thereof. Here, the air supplying flow paths 22a and 22b, the air pump, and the like, constitute an air supplying section.

Moreover, in the present embodiment, also anode gas inflow ports 811 (see FIG. 15) for adjusting flow volumes are formed between the anode gas supplying manifold 810 and the anode gas flow paths 86 of the generator cells 8 in the cell stack 80.

Cathode gas outflow ports 832 are formed between each of the cathode gas flow paths 87 and the cathode gas exhausting manifold 840. The sizes of the cross sections of the cathode gas outflow ports 832 are formed to be equal to one another in the present embodiment. Moreover, also anode gas outflow ports 812 are formed between each of the anode gas flow paths 86 and the anode gas exhausting manifold 820. The sizes of the cross sections of the anode gas outflow ports 812 are also formed to be equal to one another. By setting the sizes of the cross sections of the outflow ports 832 and 812 to be constant, not only the flow volumes of the air in the gas flow paths 87 and 86 can be almost uniform without causing any dispersion, but also the setting of the sizes of the cross sections of the inflow ports 831 and 811 becomes easier.

Here, it is supposed that the size of the cross section of the cathode gas inflow port 831 into the cathode gas flow path 87 of the $n^{th}$ generator cell 8 from the upstream side of the air circulation, that is, the air supply side of the cathode gas supplying manifold 830 is set to be En×Fn as shown in FIG. 21. En and Fn are supposed to be 2 mm, and the flow velocity of the air in each of the generator cells 8 of the air flow volume of 7700 ccm is calculated by a fluid simulation in the case where the dimensions of the cross section of the meandering flow path of the cathode gas flow path 87 is 5 mm×0.3 mm, the number of the partition walls in the flow path 87 is 5, and the number of stacks is 10. The results are shown in a graph in FIG. 24. Here, a graph legend gr–x denotes a difference from the initial value of 2 mm in the direction of En (flow path narrowed pitch), and a graph legend gr–y denotes a difference from the initial value of 2 mm in the direction of Fn (flow path narrowed pitch).

Figure 24:
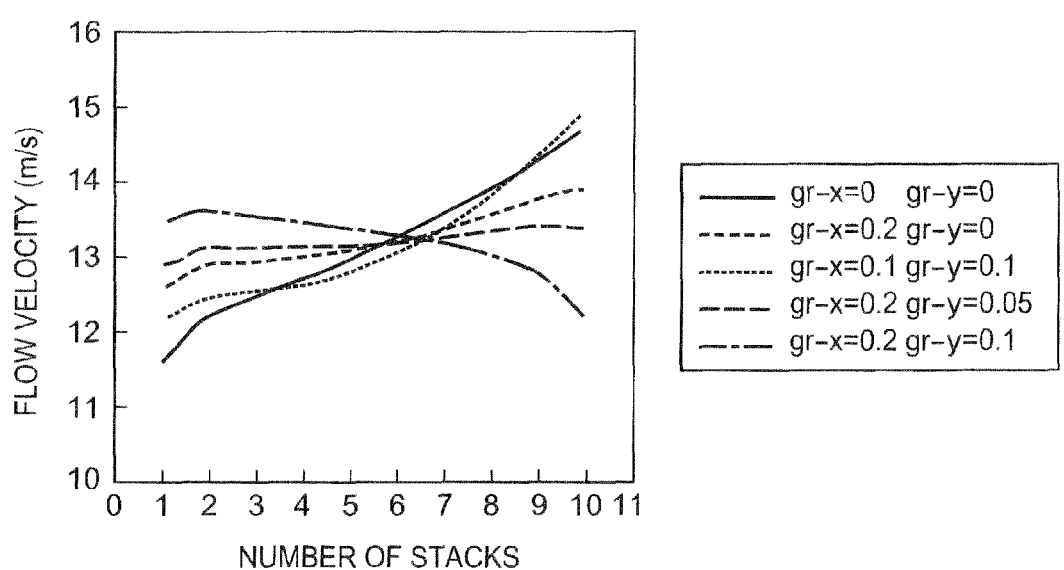
FIG. 24 is a graph showing the results of the fluid simulation of the cathode gas flow velocity of each generator cell.

As apparent from FIG. 24, the case of gr–x=0 and gr–y=0 indicates a flow velocity distribution among the stacks when the dimensions of the cross sections of all of the cathode gas inflow ports 831 are the same, and the distribution becomes the one in which the flow velocity becomes faster from the upstream side to the downstream side of the air circulation. In such a flow velocity distribution, the outputs of the generator cells 8 become uneven, and the intrinsic performances of the cell stack 80 cannot be achieved sufficiently.

Moreover, when the magnitudes of the cathode gas inflow ports 831 are gradually reduced by changing the gr–x and the gr–y, then it is found that the flow volume distributions among the stacks changes from FIG. 24. In the present embodiment, the situation is almost uniform at about gr–x=0.2 and gr–y=0.05. As described above, according to the present embodiment, the dispersion of the flow volume of the air flowing in each of the cathode gas flow paths 87 of the plurality of generator cells 8 among the flow paths 87 of the generator cells 8 can be suppressed. Moreover, also the dispersion of the flow volume of the reformed gas flowing in each of the anode gas flow paths 86 among the flow paths 86 of the generator cells 8 can be suppressed.

Incidentally, the magnitudes of the anode gas inflow ports 811 for flow volume adjustment formed between the anode gas supplying manifold 810 and the anode gas flow paths 86 of the generator cells 8 are also set similarly to the method mentioned above. However, the flow velocities of the reactant gas are smaller in the anode gas flow paths 86 than those in the cathode gas flow paths 87 to be about 1/3 to 1/10 generally. Consequently, because the dispersion of the flow volumes of the reactant gas is also smaller, the magnitudes of the cross sections of the anode gas inflow ports 811 are set according to the smaller dispersion.

Now, in the present embodiment, when the hydrogen in the offgas has been completely combusted, $CO_2$, $H_2O$, $N_2$, and $O_2$ are exhausted from the catalyst combustor 9. Here, the following two systems of flow paths to supply reactant gases to the generator cells 8 exist: the anode gas flow paths 86 to send a reformed gas and the cathode gas flow paths 87 to send air. But, one system of the flow path exists as the flow path to exhaust gases after reactions from the generator cells 8. In this case, since the flow volume of the gases of the exhaust system is more than the that of the supply system, the pressure loss in the flow path of the exhaust system enlarges when each of the numbers of the pipes of the supply system and the exhaust system is one, and when the diameters of the pipes are the same. It is desirable to enlarge the pipe diameter of the exhaust system than that of the supply system in order to suppress the pressure loss in the flow path of the exhaust system. Alternatively, it is desirable to set the pipe diameters of the supply system and the exhaust system to be the same, and to set the number of the flow paths of the exhaust system to be more than that of the supply system. In the present embodiment, since the exhaust system including the two flow paths of the exhausting flow paths 51 and 52 with respect to the supply system including one flow path of the supplying flow path 53 is adopted, the pressure loss in the flow paths of the exhaust system can be effectively suppressed.

Figure 25:
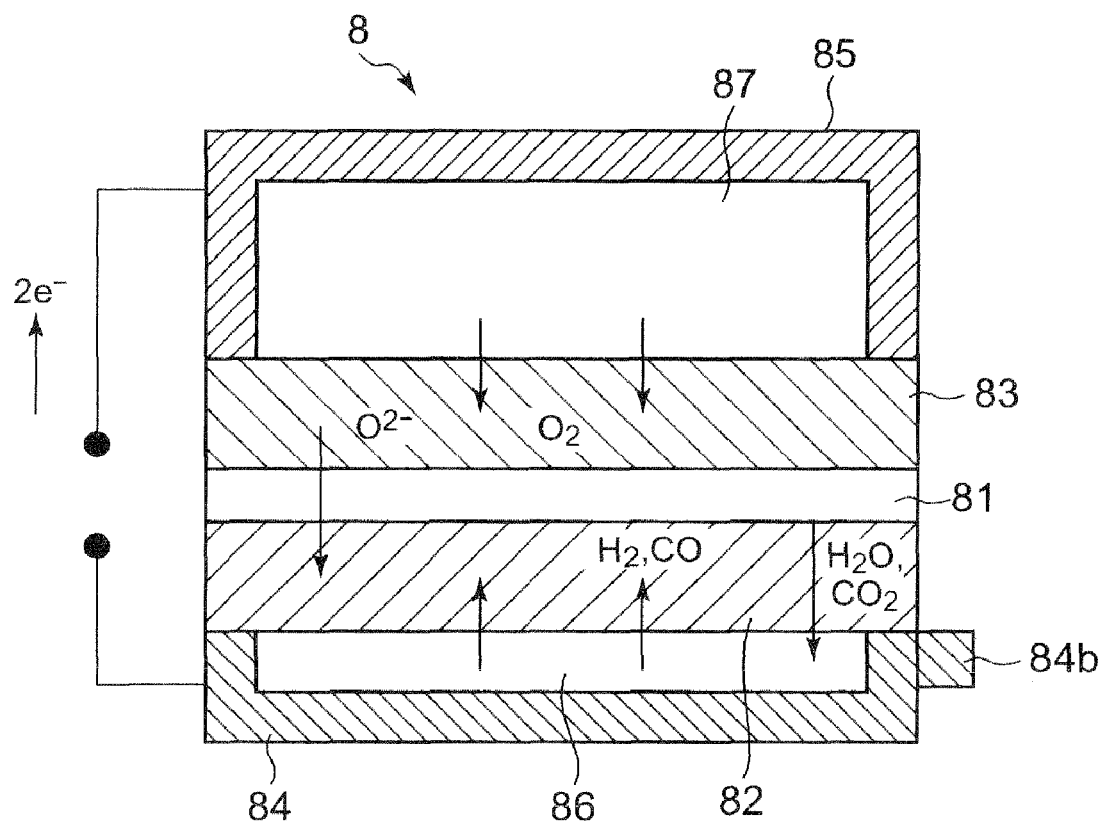
FIG. 25 is a sectional view of an example in which the height of the cathode gas flow of the generator cell is made higher than the height of the anode gas flow.

Moreover, in the solid oxide type fuel cell as in the present embodiment, it is necessary to flow more air than the flow volume of the reformed gas through the cathode gas flow paths. Consequently, when the cross-sectional areas of the cathode gas flow paths 87 and the anode gas flow paths 86 are the same, then the pressure losses of the air in the cathode gas flow paths 87 are larger than the pressure losses of the reformed gases in the anode gas flow paths 86. Here, since the pressure loss in the flow path having a sectional shape of a rectangle reduces in inverse proportion to almost the cube of the shorter side of the cross section of the flow path, the pressure loss of the air flowing through the cathode gas flow path 87 can be effectively prevented by enlarging the height of the cathode gas flow path 87 in comparison with that of the anode gas flow path 86 as shown in FIG. 25.

Incidentally, although an example of using both of the anode gas flow path 86 and the cathode gas flow path 87 formed as zigzag meandering flow paths with internal flow path partition walls is shown in the present embodiment described above, the so-called pool shaped flow paths may be used without the internal flow path partition walls. In this case, the advantage of simplifying the changes of the connection positions and the connection structures of the air supplying flow paths 22a and 22b to be connected to the cathode gas flow path 87 is obtained. Also in this case, the pressure loss of the air flowing through the cathode gas flow path 87 can be effectively prevented by enlarging the height of the cathode gas flow path 87 in comparison with that of the anode gas flow path 86. Moreover, although the generator cell provided to the fuel cell device is a solid oxide type fuel cell, the generator cell is not limited to this one. A molten carbonate fuel cell and a solid polymer fuel cell may also be used.

What is claimed is:

1. A fuel cell device comprising a plurality of generator cells to generate electric power by an electrochemical reaction of an oxidizing agent and a reducing agent, wherein
    the plurality of generator cells include:
        a plurality of gas flow paths to send a reactant gas for the electrochemical reaction respectively to the plurality of generator cells; and
        a plurality of inflow ports respectively provided at a position in which the reactant gas flows into each of the plurality of gas flow paths, and wherein
    among the plurality of inflow ports, a cross-sectional dimension of an inflow port provided at a downstream side of a flowing direction of the reactant gas is smaller than a cross-sectional dimension of an inflow port provided at an upstream side of the flowing direction of the reactant gas.

2. The fuel cell device according to claim 1, further comprising a common supplying path connected to each of the plurality of gas flow paths through each of the plurality of inflow ports.

3. The fuel cell device according to claim 2, further comprising a supplying section to supply the reactant gas to the common supplying path, wherein the plurality of generator cells are laminated with each other, and the reactant gas in the common supplying path flows in the same direction as a lamination direction of the generator cells.

4. The fuel cell device according to claim 1, wherein the plurality of generator cells include a plurality of outflow ports respectively provided at a position in which the reactant gas is exhausted from each of the plurality of gas flow paths, and cross-sectional dimensions of the plurality of outflow ports are the same as one another.

5. The fuel cell device according to claim 1, wherein the reactant gas is either a cathode gas including the oxidizing agent or an anode gas including the reducing agent.

6. An electronic equipment comprising:

the fuel cell device according to claim 1; and an electronic equipment main body which operates by the electric power generated by the fuel cell device.

7. A fuel cell device comprising a plurality of generator cells to generate electric power by an electrochemical reaction of an oxidizing agent and a reducing agent, wherein the plurality of generator cells include:

a plurality of electrolyte layers so that a predetermined substance permeates therethrough;

a plurality of anodes respectively provided in one surface of each of the plurality of electrolyte layers;

a plurality of anode collector electrodes which respectively abut on each of the plurality of anodes, wherein a plurality of anode gas flow paths are respectively formed on each of abutting surfaces between the anode collector electrodes and the anodes so that anode gas including the reducing agent flows therethrough;

a plurality of cathodes respectively provided in the other surface of each of the plurality of electrolyte layers;

a plurality of cathode collector electrodes which respectively abut on each of the plurality of cathodes, wherein a plurality of cathode gas flow paths are respectively formed on each of abutting surfaces between the cathode collector electrodes and the cathodes so that cathode gas including the oxidizing agent flows therethrough;

a plurality of anode gas inflow ports respectively provided at a position in which the anode gas flows into each of the plurality of anode gas flow paths; and a plurality of cathode gas inflow ports respectively provided at a position in which the cathode gas flows into each of the plurality of cathode gas flow paths, and wherein among the plurality of anode gas inflow ports, a cross-sectional dimension of an inflow port provided at a downstream side of a flowing direction of the anode gas is smaller than a cross-sectional dimension of an inflow port provided at an upstream side of the flowing direction of the anode gas.

8. The fuel cell device according to claim 7, further comprising a common supplying path connected to each of the plurality of anode gas flow paths through each of the plurality of anode gas inflow ports.

9. The fuel cell device according to claim 7, wherein a cross-sectional shape of each of the plurality of anode gas flow paths and a cross-sectional shape of each of the plurality of cathode gas flow paths are rectangular, and a shorter side of two sides of the cross-sectional shape of each of the plurality of anode gas flow paths is smaller than a shorter side of two sides of the cross-sectional shape of each of the plurality of cathode gas flow paths.

10. The fuel cell device according to claim 7, wherein the plurality of generator cells include a plurality of anode gas outflow ports respectively provided at a position in which the anode gas is exhausted from each of the plurality of anode gas flow paths, and cross-sectional dimensions of the plurality of anode gas outflow ports are the same as one another.

11. An electronic equipment comprising:

the fuel cell device according to claim 7; and an electronic equipment main body which operates by the electric power generated by the fuel cell device.

12. A fuel cell device comprising a plurality of generator cells to generate electric power by an electrochemical reaction of an oxidizing agent and a reducing agent, wherein the plurality of generator cells include:

a plurality of electrolyte layers so that a predetermined substance permeates therethrough;

a plurality of anodes respectively provided in one surface of each of the plurality of electrolyte layers;

a plurality of anode collector electrodes which respectively abut on each of the plurality of anodes, wherein a plurality of anode gas flow paths are respectively formed on each of abutting surfaces between the anode collector electrodes and the anodes so that anode gas including the reducing agent flows therethrough;

a plurality of cathodes respectively provided in the other surface of each of the plurality of electrolyte layers;

a plurality of cathode collector electrodes which respectively abut on each of the plurality of cathodes, wherein a plurality of cathode gas flow paths are respectively formed on each of abutting surfaces between the cathode collector electrodes and the cathodes so that cathode gas including the oxidizing agent flows therethrough;

a plurality of anode gas inflow ports respectively provided at a position in which the anode gas flows into each of the plurality of anode gas flow paths; and a plurality of cathode gas inflow ports respectively provided at a position in which the cathode gas flows into each of the plurality of cathode gas flow paths, and wherein among the plurality of cathode gas inflow ports, a cross-sectional dimension of an inflow port provided at a downstream side of a flowing direction of the cathode gas is smaller than a cross-sectional dimension of an inflow port provided at an upstream side of the flowing direction of the cathode gas.

13. The fuel cell device according to claim 12, further comprising a common supplying path connected to each of the plurality of cathode gas flow paths through each of the plurality of cathode gas inflow ports.

14. The fuel cell device according to claim 12, wherein a cross-sectional shape of each of the plurality of anode gas flow paths and a cross-sectional shape of each of the plurality of cathode gas flow paths are rectangular, and a shorter side of two sides of the cross-sectional shape of each of the plurality of anode gas flow paths is smaller than a shorter side of two sides of the cross-sectional shape of each of the plurality of cathode gas flow paths.

15. The fuel cell device according to claim 12, wherein the plurality of generator cells include a plurality of cathode gas outflow ports respectively provided at a position in which the cathode gas is exhausted from each of the plurality of cathode gas flow paths, and cross-sectional dimensions of the plurality of cathode gas outflow ports are the same as one another.

16. An electronic equipment comprising:
the fuel cell device according to claim 12; and
an electronic equipment main body which operates by the electric power generated by the fuel cell device.

* * * * *